Dec. 4, 1928.
G. C. VOSS
1,694,150
SAW
Filed July 21, 1927
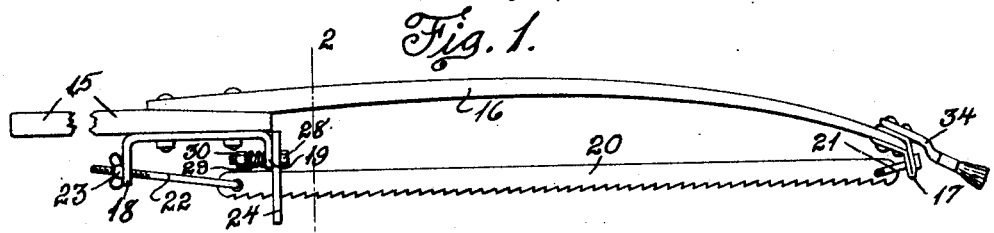
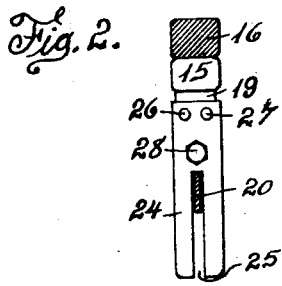
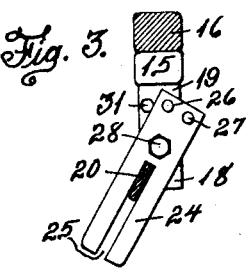
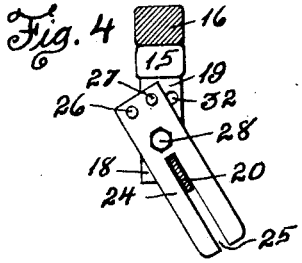
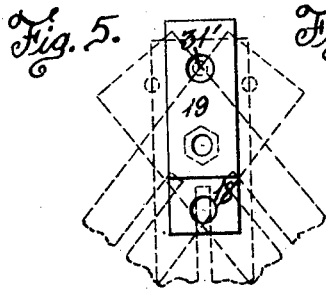
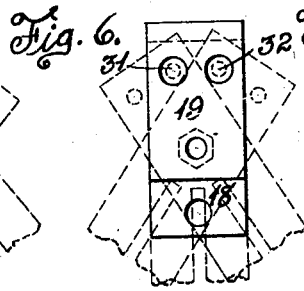
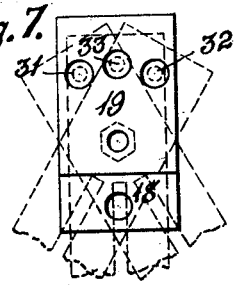
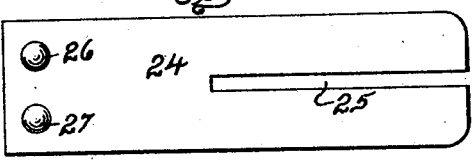
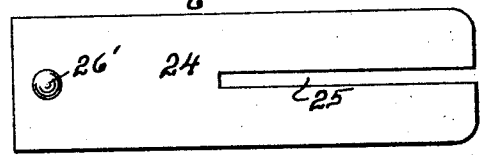
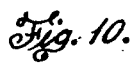
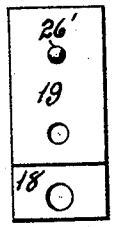
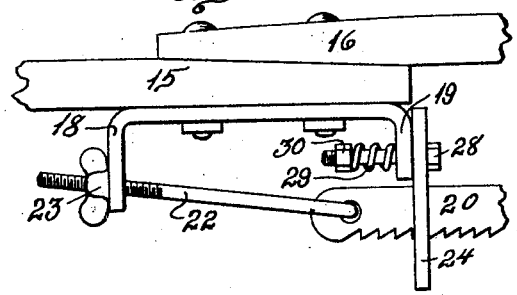
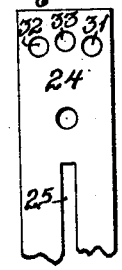
Inventor:
George C. Voss.
By Silas L. Swett
Attorney.

Patented Dec. 4, 1928.

1,694,150

UNITED STATES PATENT OFFICE.

GEORGE C. VOSS, OF EXIRA, IOWA, ASSIGNOR OF ONE-THIRD TO JOHN H. RENDLEMAN AND ONE-THIRD TO ROY R. WIARD, BOTH OF EXIRA, IOWA.

SAW.

Application filed July 21, 1927. Serial No. 207,444.

An object of this invention is to provide an improved saw for the trimming or pruning of trees.

A further object of the invention is to provide an improved trimming or pruning saw having a rotatably adjustable blade.

A further object of the invention is to be found in the provision of improved means for adjusting and positioning the rotatably adjustable blade of a trimming or pruning saw.

A further object of the invention is to provide a brush element in combination with a trimming or pruning saw, said brush element being adapted for use in painting or coating the stumps from which limbs of trees have been severed.

In the use of a trimming or pruning saw, it is frequently found desirable to have a blade that may be rotated slightly about its longitudinal axis or set at an angle with the tensioning frame in order that the saw may be operated in restricted spaces between limbs of a tree or to insure the desired angle of cut. The construction that forms the subject matter of this invention provides simple and efficient means for so rotating the saw blade as to give varying angles of cut without the necessity of releasing the tension on the blade.

My invention consists in the construction, combination and arrangement of elements hereinafter set forth, pointed out in the claims and illustrated by the accompanying drawing, in which—

Figure 1 is a side elevation of my improved saw completely assembled and ready for practical use, a portion of the handle being broken away to conserve space. Figure 2 is a cross-section, on an enlarged scale, on the indicated line 2—2 of Figure 1. Figure 3 is a cross-section similar to Figure 2, showing the saw blade set at an angle with the tensioning frame. Figure 4 is a cross-section similar to Figure 3, showing the saw blade set at another angle with the tensioning frame. Figure 5 is an end elevation, on an enlarged scale, of the ratchet end of one form of attaching yoke employed in the invention. Figure 6 is a view similar to Figure 5 illustrating a different form of ratchet on an attaching yoke. Figure 7 is a view similar to Figures 5 and 6 illustrating yet another form of ratchet end of an attaching yoke; dotted lines in Figures 5, 6 and 7 indicating various positions of a ratchet plate. Figure 8 is a view, on an enlarged scale, of the contacting face of a ratchet plate adapted for use with the yoke illustrated in Figure 6. Figure 9 is a view similar to Figure 8 illustrating a ratchet plate adapted for use with the yokes shown in Figures 5 and 7. Figure 10 is a view similar to Figures 5, 6 and 7 showing yet another form of ratchet end of an attaching yoke. Figure 11 illustrates a ratchet plate adapted for use with the construction shown in Figure 10. Figure 12 is a detail side elevation of the attaching yoke and ratchet mechanism.

In the construction of the invention as shown, the numeral 15 designates a relatively long, slender handle which may be formed of wood or metal and be of any desired length. Bolted or otherwise secured to one end of the handle 15 is a spring bow 16 forming an extension of said handle and tapering toward its free end to terminate in an apertured clip 17. A substantially U-shaped yoke is formed with an arm 18 and a relatively shorter arm 19 and is fastened to the handle 15 adjacent and opposite to the fixed end of the bow 16, the bolts used in securing said bow to the handle offering convenient means for securing said yoke, the shorter arm 19 of said yoke being nearer to the free end of said bow than the arm 18. A flexible, toothed saw blade 20 is pinned at one end to a bolt 21, said bolt being pivotally mounted in and extending through the aperture in the clip 17, and the other end of said blade 20 extends beneath the arm 19 to receive the hooked end of an adjusting rod 22, the other end of said rod being threaded and passing loosely through an aperture in the arm 18 and having an adjusting nut 23 threaded thereon and bearing against said arm. Tightening of the nut 23 produces a pull on the blade 20 and tends to spring the bow 16, thus creating and maintaining a tension on said blade. A ratchet plate 24 is formed with a longitudinal slot 25 opening through one end and spaced, rounded studs or rivets 26, 27 on one surface adjacent the other end, and said plate is adapted to be pivotally mounted on and against the outer face of the arm 19 by means of a bolt 28 passing through said plate and arm, an expansive coil spring 29 being mounted on said bolt between the arm 19 and the nut 30, so that pressure is exerted against said nut tending to hold the surfaces of said arm and plate in intimate contact, the blade 20 being received in the slot 25 and holes or recesses 31, 32 being formed in the outer surface of the arm 19 to receive the studs 26 and 27, respectively. With the plate 24 in alinement with the arm 19, both studs 26 and 27 are seated in their respective holes or recesses in said arm and held against accidental displacement by the pressure of the spring 29 against the nut 30, but said plate may be rotated about the bolt 28, disengaging said studs from their seats, until, when rotated in one direction, the stud 26 seats in the recess 32, as shown in Figure 3, or, when rotated in the other direction, the stud 27 seats in the recess 31, as shown in Figure 4, the blade, by virtue of its engagement in the slot 25, pivoting in the clip 17 to assume a new position as indicated. In the modification shown in Figures 5 and 9, one stud or rivet 26' is shown on the plate 24 adapted to engage in a single hole or recess 31' in the arm 19, said stud 26' engaging against the margins of said arm when the plate 24 is moved out of alinement therewith. In the modification shown by the combination of Figures 7 and 9, the arm 19 is wider and three holes or recesses 31, 32 and 33 are shown therein in position to be selectively engaged by the stud 26' of the plate 24. The modification illustrated by the combination of Figures 10 and 11 is the reverse of that just described, the stud 26' being carried by the arm 19 and the holes or recesses 31, 32 and 33 being formed in the contacting surface of the plate 24, the operation being in all respects similar to that above set forth. A brush member 34, of any desired shape and size, is bolted or otherwise secured to the end of the handle 15 contiguous to that whereon is fixed the bow 16, and said brush element is convenient and desirable for use in painting or smearing the stumps of limbs after the cutting operation, thereby preventing the escape of sap from such stumps and the danger of rotting or decay therein.

It is obvious that modifications and changes of design, shape and proportion are possible without departing from the spirit of my invention, hence I wish to be understood as being limited solely by the scope of the appended claims.

I claim as my invention—

1. A saw comprising a relatively long handle, a spring bow on and extending longitudinally from one end of said handle, a U-shaped yoke having arms of unequal length mounted with the shorter of said yoke arms toward the free end of said bow on said handle adjacent and opposite to the fixed end of said bow, a flexible, toothed blade between the free end of said bow and the longer arm of said yoke, means for pivotally mounting for angular adjustment about its longitudinal axis and for tensioning said blade, and means pivotally mounted on the shorter of said arms and engaging said blade whereby said blade may be rotatively positioned.

2. A saw comprising a relatively long handle, a spring bow on and extending longitudinally from one end of said handle, a U-shaped yoke having arms of unequal length mounted with the shorter of said yoke arms toward the free end of said bow on said handle adjacent and opposite to the fixed end of said bow, a flexible, toothed blade between the free end of said bow and the longer arm of said yoke, means for pivotally mounting for angular adjustment about its longitudinal axis and for tensioning said blade, and a ratchet plate engaging said blade and pivotally mounted on the shorter arm of said yoke, whereby said blade may be positioned relative to said yoke.

3. In a saw having a relatively long handle, a spring bow on and extending longitudinally from one end of said handle, a U-shaped yoke having arms of unequal length mounted with the shorter of said yoke arms toward the free end of said bow on said handle adjacent and opposite to the fixed end of said bow, a flexible, toothed blade between the free end of said bow and the longer arm of said yoke, and means for pivotally mounting for angular adjustment about its longitudinal axis and for tensioning said blade, ratchet means for positioning said blade relative to said yoke, said means comprising a plate in spring-pressed pivotal relation with the shorter arm of said yoke, rounded studs on said plate engaging in recesses in said arm and a slot in the end of said plate opposite said studs and engaging said blade.

4. In a saw having a relatively long handle, a spring bow on and extending longitudinally from one end of said handle, a U-shaped yoke having arms of unequal length mounted with the shorter of said arms toward the free end of said bow on said handle adjacent and opposite to the fixed end of said bow, a flexible, toothed blade between the free end of said bow and the longer arm of said yoke and means for pivotally mounting for angular adjustment about its longitudinal axis and for tensioning said blade, ratchet means for positioning said blade relative to said yoke, said means comprising a plate in spring-pressed pivotal relation with the shorter arm of said yoke, recesses in one end of said plate having their centers in concentric relation with the pivot thereof, a rounded stud on said arm engaging with one or another of said recesses and a slot in the end of said plate opposite said recesses and engaging said blade.

Signed at Exira, in the county of Audubon and State of Iowa, this 3rd day of July, 1927.

GEO. C. VOSS.